United States Patent [19]

Mowdood

[11] Patent Number: 4,605,693
[45] Date of Patent: Aug. 12, 1986

[54] RUBBER-METAL ADHESION PROMOTERS

[75] Inventor: Syed K. Mowdood, Akron, Ohio

[73] Assignee: The Goodyear Tire & Rubber Company, Akron, Ohio

[21] Appl. No.: 694,380

[22] Filed: Jan. 24, 1985

Related U.S. Application Data

[62] Division of Ser. No. 584,180, Feb. 27, 1984, Pat. No. 4,521,558.

[51] Int. Cl.$^4$ ................................................ C08K 5/17
[52] U.S. Cl. ........................................... 524/239; 524/534; 524/535; 152/565; 156/124; 156/910; 428/295
[58] Field of Search ............... 524/239, 534, 535; 152/565; 156/124, 910; 428/295

[56] References Cited

U.S. PATENT DOCUMENTS

| | | | |
|---|---|---|---|
| 2,413,857 | 1/1947 | Bersworth et al. | 524/239 |
| 2,428,353 | 10/1947 | Bersworth | 524/239 |
| 2,667,522 | 1/1954 | McElroy | 524/239 |
| 3,234,173 | 2/1966 | Mann et al. | 524/239 |
| 3,846,160 | 11/1974 | Hirakawa et al. | 152/565 |
| 3,862,099 | 1/1975 | Marans | 524/239 |
| 3,916,072 | 10/1975 | Hausch et al. | 156/910 |
| 4,077,948 | 3/1978 | Cowell et al. | 156/124 |
| 4,154,911 | 5/1979 | Bak et al. | 524/158 |
| 4,239,663 | 12/1980 | Ravagnani et al. | 156/910 |
| 4,299,640 | 11/1981 | Erickson | 152/565 |
| 4,300,973 | 11/1981 | Bezwada | 152/565 |
| 4,324,281 | 4/1982 | Ravagnani et al. | 152/565 |
| 4,435,477 | 3/1984 | Davis | 156/124 |

FOREIGN PATENT DOCUMENTS 735957  6/1966  Canada .............................. 524/239

*Primary Examiner*—Joseph L. Schofer
*Assistant Examiner*—N. Sarofim
*Attorney, Agent, or Firm*—Alvin T. Rockhill

[57] ABSTRACT

Good adhesion of rubber to metal is very important in rubber articles containing metal reinforcement. For example, in a steel belted tire good adhesion between the tire rubber and the metal tire cord is of utmost importance. Good metal to rubber adhesion is also of great importance in a variety of other rubber products, including power transmission belts, conveyor belts, and rubber hoses containing metal reinforcements. This invention reveals the use of certain adhesion promoters that are useful in rubber products containing metal reinforcements. More specifically, this invention discloses the use of allyl phosphite esters, allyl phosphate esters, 5-nitro isatoic anhydride, iminodiacetic acids, N-substituted iminodiacetic acids, salts of N-substituted iminodiacetic acids, and salts of iminodiacetic acids as adhesion promoters in composites containing rubber and metal.

13 Claims, No Drawings

{ 4,605,693 }

RUBBER-METAL ADHESION PROMOTERS

This is a divisional of application Ser. No. 584,180, filed Feb. 27, 1984 (now issued as U.S. Pat. No. 4,521,558).

TECHNICAL FIELD

Metallic reinforcing elements are often embedded in rubber articles to provide them with greater structural strength. Good rubber to metal adhesion is very important in such rubber articles containing metal reinforcement. This invention discloses a group of adhesion promoters that greatly improve the adhesion between metal reinforcing elements and rubber when they are present in the rubber in small amounts.

BACKGROUND OF THE INVENTION

It is often desirable to reinforce rubber articles by incorporating therein metal reinforcing elements. For example, tires, conveyor belts, power transmissions belts, timing belts, hoses, and a variety of other rubber articles are often reinforced with metal elements. In order for rubber articles which are provided with steel reinforcing elements to function effectively it is imperative that good adhesion between the rubber and the metal reinforcing element be maintained.

Methods of improving metal to rubber adhesion have been the subject of considerable experimentation and research. Various solutions have been suggested which have provided various degrees of success. For example, various physical configurations of cabled wire filaments have been used to enhance physical or mechanical adhesion to rubber. Also, the surface of wire filaments have been treated by various materials and methods to enhance their adhesion to rubber. For example, pneumatic vehicle tires are often reinforced with cords prepared from steel filaments which are coated with brass.

Steel is very prone to oxidation, which even in minor degrees is highly deleterious to rubber-metal adhesion. Thus, generally steel reinforcement elements are coated with brass in order to facilitate rubber-metal adhesion. Normally steel reinforcing elements are coated with brass that is an alloy of only copper and zinc. However, ternary brass alloys that are useful for coating steel reinforcing elements are known by those skilled in the art. For example, U.S. Pat. No. 4,347,290 discloses a ternary brass alloy containing copper, zinc, and cobalt. Coating steel reinforcing elements with ternary brass alloys containing copper, zinc, and iron is also known to be effective in improving rubber to metal adhesion. Steel reinforcing elements can be provided with work-hardened nickel coatings in order to improve the steels resistance to static fatigue corrosion. U.S. Pat. No. 3,749,558 discloses a steel tire reinforcement coated with a layer of nickel which is covered by a brass outer coating. Thus, it is known to coat metal reinforcing elements with various alloys to improve the reinforcing elements adhesion to the rubber in which it is embedded. It is also known to treat metal reinforcing agents with various chemicals in order to improve their adhesion to rubber. For instance, U.S. Pat. No. 3,586,568 discloses a process for treating such a metal reinforcing element with a mixture of chromic acid and phosphoric acid in order to improve the metals bonding to elastomeric materials. U.S. Pat. No. 4,299,640 reveals that the adhesion of brass plated steel cords to rubber can be improved by treating such cords with dilute aqueous solutions of certain amino carboxylic acids and their corresponding ammonium, lithium, sodium, and/or potassium salts and salt hydrates.

It is also known that various agents can be mixed into rubber which will increase the adhesion between the rubber and metal reinforcements embedded in it. U.S. Pat. No. 3,894,903 discloses a process for improving the bonding of rubber to copper and copper alloys by incorporating into the rubber before vulcanization certain s-triazines, for instance 2-m-hydroxyphenoxy-4-chloro-6-aminotriazine.

U.S. Pat. No. 3,991,130 discloses a method for improving adhesion between vulcanizable elastomeric compositions and metal surfaces by incorporating into the elastomer an organo-nickel salt and then subsequently vulcanizing the elastomeric composition while it is in contact with the metal surface. U.S. Pat. No. 3,676,256 indicates that metal reinforced rubber vulcanizates containing air oxidized furnace carbon blacks show improved adhesion to brass surfaces.

The materials to which this invention is directed, rubbers reinforced with metals, are within the general class of materials called composites. A composite is a complex material containing two or more distinct and structurally complimentary substances (in this case rubber and metal) which are combined to produce desirable structural and/or functional properties not present in any individual component. For example, steel belts can be incorporated into a pneumatic rubber tire to attain desirable properties that cannot be achieved if the tire is built with rubber alone. In order for the metal and rubber to compliment each other in such composites it is necessary for there to be good adhesion between the rubber and metal.

SUMMARY OF THE INVENTION

This invention reveals the use of various chemical compositions which can be mixed with the rubber in rubber-metal composites to increase the adhesion between the metal and the rubber. These adhesion promoters are particularly useful in improving aged rubber-metal adhesion. More specifically, this invention discloses a composite comprising a rubber composition with a metal reinforcing element embedded therein, wherein said rubber composition contains from about 0.05 to about 10 parts per hundred parts of rubber by weight of at least one adhesion promoter selected from the group consisting of allyl phosphite esters, allyl phosphate esters, 5-nitro isatoic anhydride, iminodiacetic acids, N-substituted iminodiacetic acids, salts of N-substituted iminodiacetic acids, and salts of iminodiacetic acids.

This invention also reveals a rubber composition, which is useful in articles of manufacture which have embedded therein metal reinforcements, which comprises a rubber and from about 0.05 to about 10 parts per hundred parts of rubber by weight of an adhesion promoter selected from the group consisting of allyl phosphite esters, allyl phosphate esters, 5-nitro isatoic anhydride, iminodiacetic acids, N-substituted iminodiacetic acids, salts of N-substituted iminodiacetic acids, and salts of iminodiacetic acids.

DETAILED DESCRIPTION OF THE INVENTION

Rubber articles quite frequently contain metal elements as structural reinforcements. Some examples of rubber articles that quite frequently contain metal reinforcing elements include tires, power transmission belts, conveyor belts, hoses, and a wide variety of other manufactured rubber products and component parts. Such rubber articles are actually composites containing a rubber portion and a metal portion. The rubber in the composite articles of this invention can be selected from a wide variety of rubbery polymers. The adhesion promoters of this invention are effective in both natural and synthetic rubbers. Some representative examples of rubbers commonly used in the composites of this invention include natural rubber, styrene-butadiene rubber, synthetic polyisoprene, polychloroprene, cyclene rubbers, polybutadiene, nitrile rubbers, carboxylated nitrile rubbers, butyl rubbers, isoprene/styrene copolymers, halogenated butyl rubbers, EPDM (ethylene-propylene-diene) rubbers, epichlorohydrin homo and copolymers, EPR (ethylene-propylene) rubbers, polyisobutylene, norbornene rubbers, thiokol rubbers, and blends of various combinations of these and other diene rubbers.

Many terms are used to describe the metal reinforcing elements used to strength rubber articles. The terms "cord", "tire cord", "cable", "strand", "wire", "rod", "plate", and "filament" can all be used to describe metal reinforcing elements used to strength rubber articles. The term "metal reinforcement" as used herein is devised to be generic to all articles for reinforcing rubber articles including those listed above. Thus, without being limited thereto, a metal reinforcement can be a metal wire, a metal cord, a metal tire cord, a metal cable, a metal strand, a metal rod, a metal plate, a metal wire, or a metal filament.

The metal reinforcements used in the practice of this invention can have a wide variety of structural confirmations, but will generally be metal cords, cables, or wires. For example, a wire cord used in the practice of this invention can be composed of 1 to 50 or even more filaments of metal wire which are twisted or cabled together to form a metal cord. Therefore, such a cord can be monofilament in nature, although this is considered to be rare, or can be composed of multiple filaments. As a general rule, it is preferred for such cords to be composed of at least four filaments. For example, the cords used in automobile tires generally are composed of three to six cabled filaments, the cords used in truck tires normally contain 10 to 30 cabled filaments, and the cords used in giant earth mover tires generally contain 40 to 50 cabled filaments.

The metal generally used in the reinforcing elements of this invention is steel. The term steel as used in the present specification and claims refers to what is commonly known as carbon steel, which is also called high-carbon steel, ordinary steel, straight carbon steel, and plain carbon steel. An example of such a steel is American Iron and Steel Institute Grade 1070-high-carbon steel (AISI 1070). Such steel owes its properties chiefly to the presence of carbon without substantial amounts of other alloying elements. It is generally preferred for steel reinforcements to be individually coated or plated with a transition metal or alloy thereof. Some representative examples of suitable transition metals and alloys thereof include: zirconium, cerium, lanthanum, nickel, cobalt, tin, titanium, zinc, copper, brass, and bronze. Brass is an alloy of copper and zinc which can contain other metals in varying lesser amounts and bronze is an alloy of copper and tin which sometimes contains traces of other metals. The metal reinforcements which are generally most preferred for use in the practice of this invention are brass plated carbon steels. Alpha brass, which contains from about 62 to 75 percent copper and 38 to 25 percent zinc, is preferred for coating the metal reinforcements of this invention.

It is well recognized that steel reinforcements can be plated or coated with transition metals or alloys by various methods to obtain a thin coating. It is generally preferable for this coating to be monomolecular and somewhat microporous in nature. In general, the metal reinforcing elements of this invention should be coated, if desired, to a final thickness (after drawing) of from about 0.05 microns to about 0.40 microns. It is generally most preferred for the steel reinforcements of this invention to be coated with brass alloys to a final thickness of from about 0.12 microns to about 0.25 microns. The optimum thickness of the transition metal or alloy plating is a function of numerous variables, such as the nature of the metal being coated, the nature of the transition metal or alloy, the mode of deposition, the thickness of the initial oxide layers, the magnitude of residual stresses, and the reactivity of the rubber vulcanization system.

Transition elements and alloys thereof can be coated onto steel reinforcing elements by using any technique that will result in a coating layer of desired thickness and composition. One means of applying such a coating is to dip the steel reinforcing element into a molten bath of the transition metal or alloy. A more practical technique for applying such a coating is electroplating or electrodeposition. For example, a steel element can be plated with brass by applying a layer of copper and a layer of zinc to the steel element followed by heating the steel reinforcing element to a temperature high enough to promote the diffusion of the copper and zinc (at least 450° C.). The copper and zinc layers can be electroplated onto the steel reinforcing element in any order. It has been found to be convenient to first apply a copper layer and then to apply a zinc layer as the final step in the electroplating process. The copper and zinc layers should be electroplated onto the steel reinforcement in the proportion that it is desired for them to represent in the brass alloy coating.

Numerous electroplating techniques can be employed to deposit the copper and zinc layers onto steel reinforcing elements. A copper layer can be electroplated onto a steel element utilizing a plating solution containing copper cyanide or copper pyrophosphate. A copper pyrophosphate electroplating solution typically contains about 22 to 38 grams of copper per liter and 150 to 250 grams of $P_2O_7$-ions per liter (the ratio of $P_2O_7$-ions to copper ions is from about 6 to 8) with the pH of the solution being in the range of from about 8 to about 9.3. The pH of such a solution can be kept in this range by the addition of an alkaline aqueous solution of potassium hydroxide or with pyrophosphoric acid ($H_4P_2O_7$). It is generally preferred for copper pyrophosphate electroplating solutions to contain about 31 grams of copper ion per liter and about 210 grams of $P_2O_7$-ion per liter with the pH of the solution being about 8.8 to about 9.2. Copper is generally electroplated onto steel elements from copper pyrophosphate plating solution utilizing a current density of about 8 to about 18 amps per square decimeter at a temperature of about 50° C. to about 60° C.

Numerous electroplating solutions can be employed for depositing a zinc layer onto steel reinforcing elements. Some representative examples of such aqueous solutions include solutions of zinc cyanate, zinc sulfate, zinc chloride, zinc fluoroborate and zinc pyrophosphate. A typical zinc sulfate electroplating solution will contain from about 40 to about 90 grams of zinc-ion per liter of solution and have a pH of about 1 to about 4.5. A more preferred zinc sulfate electroplating solution will contain about 80 grams of zinc-ion per liter of solution and have a pH of about 3 to about 3.7. Zinc layers are generally deposited from such zinc sulfate electroplating solutions utilizing a cathode current density of about 20 to about 30 amps per square decimeter at a temperature ranging from about 16° C. to about 28° C. with ambient temperature normally being preferred.

The two distinct layers of copper and zinc which can be sequentially electroplated onto a steel reinforcing element can be diffused together to form a brass alloy by simply heating the steel reinforcing element on which they are deposited to a temperature of at least 450° C., preferably about 500° C. for a few seconds (about 2 to about 10 seconds). Typically, brass coated steel reinforcing wire is further drawn to the final desired filament diameter.

The plated metal reinforcements of this invention can be coated with a protective material, such as benzotriazole prior to application of the compounded rubber composition. Such protective coatings serve as a barrier to environmental degradation of the underlying metal reinforcement.

The adhesion promoters of this invention can be mixed into a rubber using ordinary compounding techniques. Generally, it will be convenient to mix the adhesion promoter into the rubber composition of this invention simultaneously with other desired compounding ingredients using any suitable mixing equipment known to those skilled in the art, such as a Banbury mixer or mill mixer. Normally the rubber compositions used in the composites of this invention will be compounded with sulfur and carbon black. Numerous mineral fillers, such as clay and silica are commonly used as partial or total replacements for carbon black. The rubber compositions of this invention will also commonly contain cure accelerators, scorch inhibitors, antidegradents, pigments, and processing oils.

The rubber articles of this invention can be produced by following a procedure which comprises: (1) preparing a rubber composition which contains at least one adhesion promoter of this invention, (2) surrounding the metal reinforcement with the rubber to conform to the desired shape of the rubber article being produced, and (3) curing (vulcanizing) the rubber article. Thus, standard techniques well-known to those skilled in the art for manufacturing rubber articles with metal reinforcing elements embedded therein can be employed in this invention. In other words, metal reinforcements can be incorporated into the rubber articles of this invention using the same techniques that are employed in incorporating metal reinforcements into ordinary rubber articles. Generally, reinforcing elements are simply surrounded by uncured rubber containing an adhesion promoter of this invention in a mold and vulcanized to produce the desired rubber article which has the metal reinforcement embedded therein.

The allyl phosphite esters that can be used as adhesion promoters in this invention have the structural formulas:

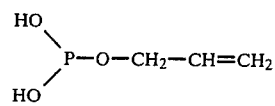

monoallyl phosphite

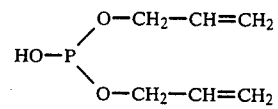

diallyl phosphite

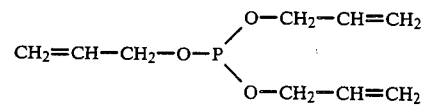

triallyl phosphite

The allyl phosphate esters that are useful as adhesion promoters in the practice of this invention have the structural formulas:

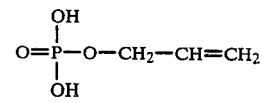

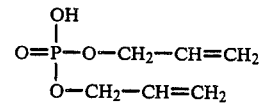

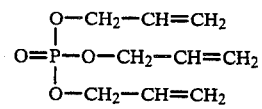

The preferred allyl phosphite ester for use as an adhesion promoter is triallyl phosphite and the preferred allyl phosphate ester for use as an adhesion promoter in this invention is triallyl phosphate.

5-nitro isatoic anhydride which can also be used as an adhesion promoter in the rubber compositions of this invention has the structural formula:

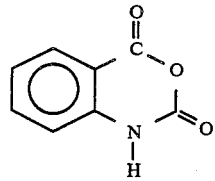

The N-substituted iminodiacetic acids which can be used as adhesion promoters in the practice of this invention have the general structural formula:

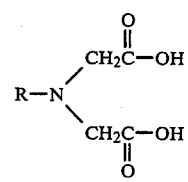

wherein R is a hydrocarbon radical. As used herein, the term "hydrocarbon radical" includes aliphatic, cycloaliphatic, and aromatic (including aromatic and cycloaliphatic substituted aromatic and aromatic substituted aliphatic and cycloaliphatic) radicals. It also includes cyclic radicals wherein the ring is completed through another portion of the molecule; that is, any two indicated substituents may together form a cyclic hydrocarbon radical. The term hydrocarbon radical as used herein also includes substituted hydrocarbon radicals which are essentially equivalent to unsubstituted hydrocarbon radicals. For example, substituted hydrocarbon radicals are fully equivalent to unsubstituted hydrocarbon radicals when the substituent does not significantly alter the characteristics or reactivity of the hydrocarbon radical. Examples of substituents that generally can be used include: halide radicals (fluoride, chloride, bromide, iodide), hydroxy radicals, ether radicals, keto radicals, carboxyl radicals, ester radicals, amino radicals, nitro radicals, cyano radicals, thioester radicals sulfoxy radicals, and amide radicals. In general, no more than about three such substituent groups will be present in the hydrocarbon radical. Such hydrocarbon radicals will normally contain from 1 to 20 carbon atoms. More commonly these hydrocarbon radicals will contain from 2 to 8 carbon atoms. Some of the most preferred N-substituted iminodiacetic acids contain additional —N(CH₂COOH)₂ groups in the hydrocarbon radical. Thus, such compounds contain more than one —N(CH₂COOH)₂ groups. Some of the most preferred N-substituted iminodiacetic acids that can be used as adhesion promoters have the structural formula:

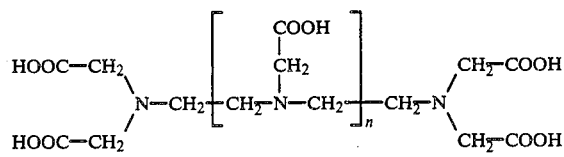

wherein n is an integer from 1 to 10 inclusive. Some representative examples of N-substituted iminodiacetic acids that can be used as adhesion promoters include: ethylene diamine tetracetic acid (EDTA), oleoyl iminodiacetic acid (OIDA), lauroyl iminodiacetic acid (LIDA), and diethylene triamine penta acetic acid (DTPA). The iminodioacetic acids that can be employed as adhesion promoters are iminodiacetic acid (IDA) and nitrioltriacetic acid (NTA).

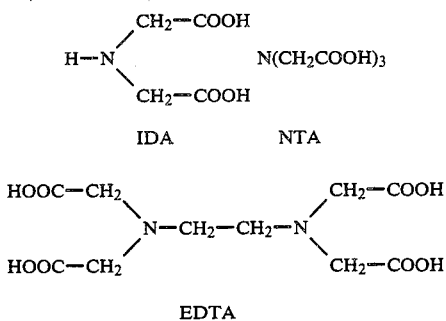

IDA  NTA

EDTA

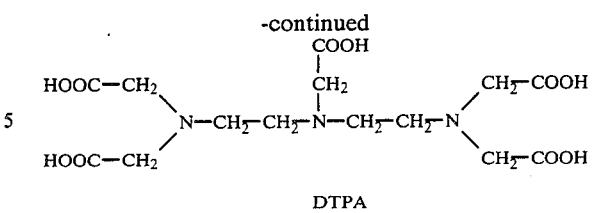

DTPA

Salts of iminodiacetic acids and N-substituted iminodiacetic acids can also be employed as adhesion promoters. Generally, these salts will be sodium, lithium, potassium, calcium, cobalt, cerium, zirconium or zinc salts with the sodium salt being most common. Some representative examples of some salts of iminodiacetic acids and N-substituted iminodiacetic acids that can be employed as adhesion promoters include: the trisodium salt of iminodiacetic acid, the disodium salt of ethylene diamine tetracetic acid, and the trisodium salt of n-hydroxyethyl ethylene diamine triacetic acid (HEDTA).

In the practice of this invention generally from about 0.05 to about 10 parts per hundred parts of rubber by weight (phr) of the adhesion promoter will be employed in the rubber composition. It is generally preferred for 0.1 to 5 parts of adhesion promoter to be employed in the rubber composition per hundred parts of rubber by weight. It is more preferred for 0.5 to 2 phr of an adhesion promoter to be employed in the rubber composition. It should be noted that various blends of different adhesion promoters can be employed in the rubber compositions of this invention.

The adhesion promoters described herein can be distributed (mixed) throughout a rubber using any convenient technique known to those skilled in the art. The rubber compositions of this invention are also cured using standard techniques well known to those skilled in the art. Generally, such rubber compositions are cured (vulcanized) under pressure at a temperature ranging from about 30° C. to about 200° C. with a metal reinforcement being embedded in the rubber composition so as to form a composite article. It is generally preferred for such composite articles to be cured at a temperature ranging from 100° C. to 160° C.

The practice of the present invention has been observed to result in improved aged rubber-metal adhesion, in many cases with improved initial (original) adhesion. The following examples are included to further illustrate the rubber-metal composites within the scope of this invention and to compare them with other rubber-metal composites outside of its scope. Such comparisons clearly show the superior adhesion obtained by practicing the present invention. The following examples are merely for the purpose of illustration and are not to be regarded as limiting the scope of the invention or the manner in which it can be practiced. Unless specifically indicated otherwise, all parts and percentages are given by weight.

EXAMPLES 1–4

Four rubber compositions prepared by mixing 2 parts of stearic acid, 8 parts of zinc oxide, 1.5 parts of an antidegradant, 1.5 parts of a phenolic tackifying resin, 65 parts of carbon black, 2 parts of a processing oil, 1.75 parts of a cobalt carboxylate of an organic acid (10 to 11% cobalt) 5.2 parts of sulfur, 0.65 parts of a sulfenamide accelerator, and an adhesion promoter as specified in Table I with 100 parts of natural rubber in a Banbury mixer. Example 1 served as a control and did not contain any adhesion promoter. Examples 2 and 3 contain triallyl phosphate and Example 4 contained triallyl phosphite as adhesion promoters. Brass coated steel wires were then embedded in the unvulcanized rubber compositions. These samples were then cured at 135° C. (275° F.) for 85 minutes.

The rubber-metal adhesion in each of these composites was then determined according to ASTM Standard D2229-73. The results of these pull-out tests are given in Table I as original adhesion.

Samples of each of the four composites were aged under various conditions. A representative sample of each of the composites was aged for ten days at 77° C. at a relative humidity of 98%. A sample of each of the composites was salt water aged in a 5% aqueous solution of sodium chloride for 48 hours at 90° C. A representative of each of the four composites was also oven-aged for seven days at 121° C. After being aged under each of these conditions the rubber-metal adhesion of each of these composites was determined again using ASTM Standard D2229-73.

TABLE I

| | | ADHESION (KILOGRAMS) | | | |
|---|---|---|---|---|---|
| Example | Adhesion Promoter, phr | Original | Humidity Aged | Salt Aged | Oven Aged |
| 1 | None | 114 | 72 | 84 | 77 |
| 2 | Triallyl Phosphate, 1.88 | 108 | 103 | 93 | 90 |
| 3 | Triallyl Phosphate, 0.95 | 122 | 107 | 101 | 99 |
| 4 | Triallyl Phosphite, 0.63 | 116 | 104 | 108 | 98 |

As can readily be determined by examining Table I, the aged adhesions for the composites containing the adhesion promoters of this invention were vastly superior to those obtained in the control (Example 1). The improved aged adhesion obtained using the adhesion promoters of this invention was most pronounced under the conditions of the humidity age. Original adhesion was also improved in Example 3 which utilized 0.95 parts of triallyl phosphate as its adhesion promoter and in Example 4 which utilized 0.63 parts of triallyl phosphite as its adhesion promoter. Thus, in some cases original adhesion is also improved by utilizing the adhesion promoters disclosed herein.

EXAMPLE 5-8

These experiments were conducted using essentially the same technique that was specified in Examples 1-4 except that the rubber composition was compounded using: 50 parts of natural rubber, 50 parts of Natsyn TM (which is a synthetic polyisoprene), 2 parts of stearic acid, 8 parts of zinc oxide, 0.75 parts of antidegradants, 2 parts of a phenolic tackifying resin, 2 parts of a processing oil, 2 parts of resorcinol, 3 parts of cobalt naphthenate, 60 parts of carbon black, 5 parts of sulfur, 1 part sulfenamide accelerators, 0.2 parts of a retarder, and the adhesion promoters specified in Table II. Original and aged adhesions were also determined employing the same ASTM procedure that was specified in Examples 1–4.

TABLE II

| | | ADHESION (KILOGRAMS) | | | |
|---|---|---|---|---|---|
| Example | Adhesion Promoter, phr | Original | Humidity Aged | Salt Aged | Oven Aged |
| 5 | None | 119 | 70 | 73 | 86 |
| 6 | Triallyl Phosphate, 1.87 | 127 | 123 | 124 | 107 |
| 7 | Triallyl Phosphate, 0.93 | 130 | 122 | 124 | 119 |
| 8 | Triallyl Phosphite, 1.87 | 114 | 115 | 125 | 106 |

Table II clearly indicates that the presence of the adhesion promoters of this invention greatly improved the aged adhesion of these composites (compare Example 5 with Examples 6, 7, and 8). The rubber-metal adhesion in the rubber compositions that contained an adhesion promoter was greatly improved over the aged adhesion of the control that did not contain an adhesion promoter. Triallyl phosphate and triallyl phosphite again proved to have an excellent ability to improve rubber to metal adhesion when they are present in rubber compositions.

EXAMPLES 9-18

The procedure specified in Examples 5 through 8 was utilized in these experiments that the adhesion promoters specified in Table III were utilized.

TABLE III

| | | ADHESION (KILOGRAMS) | | |
|---|---|---|---|---|
| Example | Adhesion Promoter, phr | Original | Humidity Aged | Salt Aged |
| 9 | None | 108 | 78 | 76 |
| 10 | DTPA, 1.8 | 108 | 97 | 99 |
| 11 | NTA, 1.8 | 113 | 97 | — |
| 12 | NTA.Na$_3$, 1.8 | 118 | 83 | 97 |
| 13 | EDTA.Na$_3$, 1.8 | 103 | 88 | — |
| 14 | HEDTA.Na$_3$, 1.8 | 108 | — | 83 |
| 15 | IDA, 1.8 | 108 | 84 | — |
| 16 | OIDA, 1.8 | 111 | 88 | — |
| 17 | LIDA, 1.8 | 108 | 81 | — |
| 18 | EDTA, 1.8 | 104 | 93 | — |

NTA.Na$_3$ = the trisodium salt of nitrilotriacetic acid
EDTA.Na$_2$ = the disodium salt of ethylene diamine tetraacetic acid
HEDTA.Na$_3$ = the trisodium salt of n-hydroxyethyl ethylene diamine triacetic acid
OIDA = oleoyl iminodiacetic acid
LIDA = lauroyl iminodiacetic acid As can readily be determined by examining Table III; humidity aged and salt aged adhesion are unexpectedly and significantly improved by the presence of iminodiacetic acids, N-substituted iminodiacetic acids, salts of N-substituted iminodiacetic acids, and salts of iminodiacetic acids in the rubber compositions in which a brass coated wire is embedded. In the "humidity aged test" a 24% increase in adhesion was observed in Example 10, wherein DTPA was utilized as the adhesion promoter, over the adhesion observed in Example 9, which served as a control and did not contain an adhesion promoter. In the "salt aged test" a 30% increase in adhesion was observed over the adhesion obtained in Example 9. All of the iminodiacetic acids, N-substituted iminodiacetic acids and salts thereof tested in these examples showed an improvement in aged adhesion properties over the control.

EXAMPLES 19-23

The procedure specified in Examples 1-4 was utilized in these experiments except that the adhesion promoters specified in Table IV were utilized in the amount shown.

TABLE IV

| Example | Adhesion Promoter, phr | ADHESION (KILOGRAMS) | |
|---|---|---|---|
| | | Original | Salt Aged |
| 19 | None | 259 | 154 |
| 20 | DTPA, 0.94 | 250 | 250 |
| 21 | EDTA.Na$_2$, 0.94 | 253 | 202 |
| 22 | IDA, 0.94 | 238 | 197 |
| 23 | OIDA, 0.94 | 250 | 195 |

The iminodiacetic acids tested all showed very great improvements in salt aged adhesion over the control. For instance, Example 20 showed a 62% increase in salt aged adhesion over the value determined in Example 19 which served as a control.

EXAMPLE 24

Two standard tire rubber formulations were prepared. These rubber formulations were identical except for the fact that one of them contained 0.75 phr of 5-nitro isatoic anhydride as an adhesion promoter. The rubber formulation that did not contain an adhesion promoter had an original adhesion of 60.7 kilograms and a humidity aged adhesion of 43.9 kilograms (using the procedure specified in Examples 1–4). The rubber formulation that utilized 5-nitro isatoic anhydride as an adhesion promoter had an original adhesion of 615 newtons and a humidity aged adhesion of 67.7 kilograms. Thus, the 5-nitro isatoic anhydride was responsible for a 54% increase in humidity aged adhesion in the rubber composition in which it was employed. This example shows the value of adding 5-nitro isatoic anhydride to rubber compositions which will be reinforced with metal reinforcing elements to improve the adhesion between the metal reinforcing element and the rubber.

While certain representative embodiments and details have been shown for the purpose of illustrating the invention, it will be apparent to those skilled in this art that various changes and modifications may be made therein without departing from the scope of the invention.

What is claimed is:

1. A composite comprising a rubber composition with a metal reinforcing element embedded therein, wherein said rubber composition contains from about 0.05 to about 10 parts per hundred parts of rubber by weight of at least one adhesion promoter selected from the group consisting of iminodiacetic acids, N-substituted iminodiacetic acids, salts of N-substituted iminodiacetic acids, and salts of iminodiacetic acids.

2. A composite as specified in claim 1 wherein said metal reinforcing element is a brass plated carbon steel.

3. A composite as specified in claim 2 wherein said rubber composition contains from 0.1 to 5 parts of said adhesion promoter per hundred parts of rubber by weight.

4. A composite as specified in claim 2 wherein said rubber composition contains from 0.5 to 2 parts of said adhesion promoter per hundred parts of rubber by weight.

5. A composite as specified in claim 1 wherein said rubber composition contains from 0.1 to 5 parts of said adhesion promoter per hundred parts of rubber by weight.

6. A composite as specified in claim 5 wherein said adhesion promoter has the structural formula:

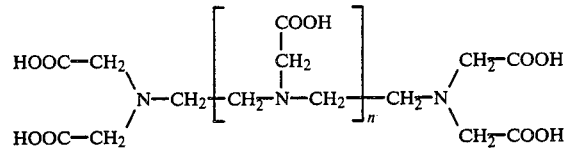

wherein n is an integer from 1 to 10 inclusive.

7. A composite as specified in claim 5 wherein said adhesion promoter is a member selected from the group consisting of ethylene diamine tetraacetic acid, iminodiacetic acid, oleoyl iminodiacetic acid, lauroyl iminodiacetic acid, nitrilotriacetic acid, diethylene triamine pentaacetic acid, the trisodium salt of iminodiacetic acid, the disodium salt of ethylene diamine tetraacetic acid, and the trisodium salt of n-hydroxyethyl ethylene diamine triacetic acid.

8. A composite as specified in claim 7 wherein said rubber composition contains from 0.5 to 2 parts of said adhesion promoter per hundred parts of rubber by weight.

9. A composite as specified in claim 8 wherein said composite is in the form of a tire.

10. A composite as specified in claim 3 wherein said rubber is at least one member selected from the group consisting of natural rubber, styrene-butadiene rubber, synthetic polyisoprene, polychloroprene, cyclene rubbers, polybutadiene, nitrile rubbers, carboxylated nitrile rubbers, butyl rubbers, isoprene/styrene copolymers, halogenated butyl rubbers, EPDM rubbers, EPR rubbers, polyisobutylene, norbornene rubbers, and thiokol rubbers.

11. A composite as specified in claim 3 wherein said rubber is at least one member selected from the group consisting of natural rubber and synthetic polyisoprene.

12. A composite as specified in claim 3 wherein said composite is in the form of a tire.

13. A composite as specified in claim 3 wherein said composite is in the form of a belt.

* * * * *